United States Patent
Gauda

(10) Patent No.: US 9,733,852 B2
(45) Date of Patent: Aug. 15, 2017

(54) ENCRYPTED SYNCHRONIZATION

(71) Applicant: ThinAir Labs, Inc., Palo Alto, CA (US)

(72) Inventor: Anthony Gauda, Palo Alto, CA (US)

(73) Assignee: ThinAir Labs, Inc., Palo Alto, CA (US)

( * ) Notice: Subject to any disclaimer, the term of this patent is extended or adjusted under 35 U.S.C. 154(b) by 0 days.

(21) Appl. No.: 14/757,998

(22) Filed: Dec. 23, 2015

(65) Prior Publication Data
US 2017/0185333 A1    Jun. 29, 2017

(51) Int. Cl.
*G06F 7/04* (2006.01)
*G06F 3/06* (2006.01)
*G06F 21/62* (2013.01)

(52) U.S. Cl.
CPC .......... *G06F 3/0622* (2013.01); *G06F 3/0665* (2013.01); *G06F 3/0673* (2013.01); *G06F 21/6218* (2013.01)

(58) Field of Classification Search
CPC ... G06F 3/0622; G06F 3/0665; G06F 21/6218
USPC .......................................... 726/2–10, 26–30
See application file for complete search history.

(56) References Cited

U.S. PATENT DOCUMENTS

| | | | |
|---|---|---|---|
| 2005/0114672 A1 | 5/2005 | Duncan | |
| 2007/0297610 A1 | 12/2007 | Chen | |
| 2007/0300287 A1 | 12/2007 | Wynne | |
| 2010/0011448 A1 | 1/2010 | Wagner | |
| 2010/0031349 A1 | 2/2010 | Bingham | |
| 2010/0100721 A1* | 4/2010 | Su | G06F 11/1456 713/150 |
| 2011/0161802 A1 | 6/2011 | Jia | |
| 2011/0252236 A1* | 10/2011 | De Atley | G06F 11/1464 713/168 |
| 2011/0252243 A1* | 10/2011 | Brouwer | H04L 9/0838 713/189 |
| 2013/0145160 A1 | 6/2013 | Bursell | |
| 2013/0262862 A1* | 10/2013 | Hartley | G06F 21/602 713/165 |
| 2014/0101434 A1* | 4/2014 | Senthurpandi | G06F 21/32 713/150 |
| 2014/0359047 A1* | 12/2014 | Lee | H04L 67/2852 709/213 |
| 2015/0052353 A1* | 2/2015 | Kang | H04L 63/0428 713/165 |
| 2015/0310188 A1 | 10/2015 | Ford | |
| 2016/0087946 A1* | 3/2016 | Yang | G06F 21/62 713/171 |
| 2016/0171239 A1* | 6/2016 | Li | G06F 21/6245 713/189 |

OTHER PUBLICATIONS

Jemel et al., "Digital safe: Secure synchronization of shared files," 2015 11th International Conference on Information Assurance and Security (IAS) Year: 2015 pp. 67-72.*

(Continued)

*Primary Examiner* — Roderick Tolentino
(74) *Attorney, Agent, or Firm* — Van Pelt, Yi & James LLP

(57) ABSTRACT

A request to store a file to be protected is received. It is detected whether the file to be protected is a file to be synchronized. The encryption key is selected based on the detection of whether the file is a file to be synchronized. The file to be protected is encrypted using the selected encryption key.

20 Claims, 11 Drawing Sheets

(56) References Cited

OTHER PUBLICATIONS

Kuo et al., "Open Stack Secure Enterprise File Sync and Share Turnkey Solution," 2014 IEEE 6th International Conference on Cloud Computing Technology and Science Year: 2014 pp. 1015-1020.*

* cited by examiner

ENCRYPTED SYNCHRONIZATION

BACKGROUND OF THE INVENTION

A data file may be encrypted to prevent unauthorized access to contents of the file. For example, data can be encrypted using a secret or public encryption key and only those that have a decryption key to the data may access the contents of the data. However, issues may arise when attempting to synchronize together multiple copies of the file that have been encrypted. For example, a user may desire to synchronize together copies of the same file to maintain a consistent copy across multiple devices or multiple users may desire to collaborate together on a single file and the copies of the encrypted file for different users may need to be synchronized. During synchronization, often only the changes from a previous version is sent and applied to different copies to save bandwidth. However, if the different copies have been encrypted using different encryption methods, it may not be possible perform incremental synchronization. Therefore, there exists a need for a better way to handle synchronization of an encryption file.

BRIEF DESCRIPTION OF THE DRAWINGS

Various embodiments of the invention are disclosed in the following detailed description and the accompanying drawings.

DETAILED DESCRIPTION

Figure 1:
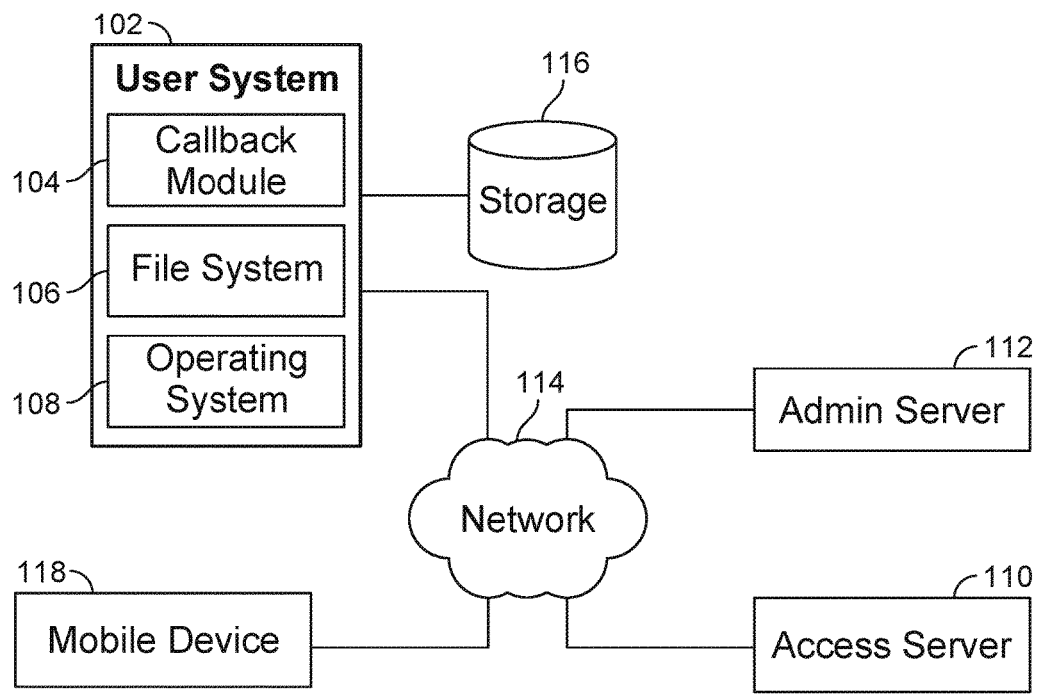
FIG. 1 is a block diagram illustrating an embodiment of a system for protecting data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically selecting an encryption key to allow data synchronization is disclosed. In some embodiments, a request to store a file to be protected is received. It is determined whether the file is a file to be synchronized. An encryption key is selected for the file based on the detection of whether the file is a file to be synchronized. For example, in order to provide the highest level of protection, each file to be protected is typically encrypted using a different encryption key. However, if the file to be protected is a copy of a file to be synchronized across other copies of the file for different devices/users, all of the copies of the file to be synchronized are to be encrypted using the same encryption key and a specific encryption key for the file is received from a key server. The file is encrypted using the selected encryption key.

Traditionally, data protection has been implemented in a top down approach where a system administrator specifies a data protection policy that gets implemented across all files of a storage for every user of the storage. These data protection policies are often complex and difficult to implement correctly to encompass all use cases. For example, usually the system administrator is the only person allowed to establish data protection policies and mechanisms while the end user without this ability is the person that knows best about contents of files and whether it should be protected. This may cause the system administrator to set security policies' that are either too strict or too lax. Additionally, if complying with the security policy is too difficult, the end user may ignore or bypass the data protection policy compliance and/or suffer from poor user experience.

Traditional file systems typically provide a static feature set which cannot be easily extended beyond a user's desired or predetermined use cases. For example, traditional file systems do not have built in script-based execution environments for defining behaviors that dynamically change the properties of the file system during execution.

In some embodiments, a dynamic execution environment within a file system is provided. This may be used for pre or post-processing of data, authentication, and other use cases.

For instance a user can define a script that dynamically redacts credit card numbers from files as they are read from disk. The script may be stored on a remote network server to prevent unauthorized modification. Another example is identifying the executable of the process that is reading a particular file and denying access unless it is on a whitelist of approved applications that can access this document.

In some embodiments, virtual file systems are provided that reside in kernel space. A kernel space may manage input/output requests from software and translate them into data processing instructions for the central processing unit and other electronic components of a computer. In some embodiments, users are able to manage activity in kernel space, which is ordinarily inaccessible by users.

The term "callback," as used herein, generally refers to executable code that is passed as an argument to other code, which is expected to call back (e.g., execute) the argument at a given point in time. A callback may be a script. In some examples, the invocation is immediate, as in a synchronous callback, or it may happen at a later time, as in an asynchronous callback.

In some embodiments, a file system with embedded data processing and authentication extensions is utilized. Such a file system can have one or more preset or user-defined callback entry points, such as, for example, open, before_open, before_close, close, write, and read. Such callbacks may be scripts and/or predefined extensions that can be configurable. The file system may have an embedded virtual machine and execution environment. The file system may also use native modules and code for executing various features and functionalities of the file system. Extensions may be scripts that define callbacks that are executed by a client when accessing the file system. The client may be installed on a computer system (e.g., personal computer, mobile device, server, etc.) that is capable of implementing virtual file systems.

In some embodiments, a user is able to define hosts (e.g., personal computers, servers, mobile devices, etc.) that include client applications that are programmed to implement virtual file systems provided herein. The client applications (or software) can virtually create one or many virtual files systems which are defined as volumes. In some situations, using a user interface (e.g., web-based interface), the user may create and manage a volume, and attach the volume to any number of hosts. Volumes that are connected to multiple hosts may behave like shared storage. Any content that does not fit on a given device may be streamed in real time. In some examples, this may be similar to using a local disk as cache and other content is swapped in and out as required without any involvement from the user or interference with the activity of the user.

In some embodiments, a virtual environment layer enables the execution of preset or user-defined scripts at the file system level. Such scripts, once executed by a computer processor, may enable various features and functionalities associated with accessing files in the file system, such as reading, writing, opening, and closing files. For example, the user may provide a script in the file system that can be executed when the file system opens a given type of file, and the script can remove certain information (e.g., metadata) from the file. In some embodiments, a user may build policies and scripts using predefined triggers and actions. This may enable a user that does not have the level of experience as a computer programmer to customize a file system.

In some embodiments, a user is able to generate scripts for execution in a virtual environment of a file system. The method can be executed by a computer system (see, e.g., FIG. 2) that is programmed or otherwise configured to implement a virtual file system layer on top of a physical (or more concrete) file system. The system can include an operating system, and the file system can be integrated with the operating system or separate from the file system.

In some embodiments, a user may utilize an administration interface to select a callback entry point to associate/upload/type/choose (from a library) a script or function which responds to the callback with the desired functionality. A library (e.g., created by a user or another entity) of predefined extensions or scripts that a user can choose from may be provided. The user may also upload or define user-defined scripts. The user may also use a policy engine to create an extension.

The administration interface may communicate with registered callbacks to a file system processing module. The administration interface may communicate registered callbacks securely. In some examples, this can be by alias or entirety. That is, instead of communicating the whole script, the system can communicate an alias of a previously defined or communicated script.

The operating system may trigger a callback event such as open, read, write, etc. The operating system may communicate the callback event to the virtual file system layer. When the virtual file system layer recognizes an event, the virtual file system layer may execute an appropriate callback from the callback module that has been predetermined for that event. An example of an event includes the opening of a file.

In some embodiments, the callback that has been executed performs a predetermined action. Control may then be returned to the file system. For example, the callback may disallow file access if a given filename includes "confidential." In such a case, access may be disallowed until a third party has authorized access. The appropriate response is then sent to the operating system. For example, upon reading a file, an extension can scan the data and determine if a given type of data (e.g., personally identifiable information, or PII) exists. If it does exist, then the system can redact the given type of data by replacing it with other data, character(s), or a string of characters (e.g., Xs). The system may also deny reads entirely based on physical location of the user or time of access.

In some embodiments, by being embedded in a file system, a callback module can be highly resistant to various security breaches, such as malicious attacks. Disk subsystems may be configured to have encrypted data at rest such that the only route to access the data is through the file system. Such virtual file systems may thus provide users with various user-defined features without compromising security.

For example, a computer system comprises a file system with a virtual file system layer. The virtual file system layer is programmed to execute callbacks. A user creates a callback to provide authentication based on geolocation, two-factor authorization, or content being accessed. The computer system monitors system events. Once an event meets criteria specified by the callback, a predetermined action is performed in the virtual file system layer. For example, upon file access, content can be dynamically modified during read operations to redact or remove sensitive data, such as credit card numbers or authorization identifiers. Files can be marked as append-only and deny all reads.

FIG. 1 is a block diagram illustrating an embodiment of a system for protecting data. User system 102, mobile device 118, administrator server 112, and access server 110 are connected together via network 114. Examples of user system 102 include a desktop computer, a laptop computer, and another computer being utilized to access protected data. For example, a user utilizes user system 102 to access data stored in storage 116. Examples of storage device 116 include a local hard drive and a removable storage of user system 102. In some embodiments, storage 116 stores data of user system 102 and at least a portion of stored data is protected. For example, at least some files stored in storage 116 are encrypted and access to the encrypted file(s) is protected. User system 102 includes callback module 104, file system 106, and operating system 108. In an alternative embodiment, storage 116 is a networked storage that is connected to network 114.

In some embodiments, file system 106 is a virtual file system that extends an existing file system of user system 102 to implement data protection and security features. For example, when a file system operation is provided to operating system 108 by one or more applications running on user system 102, operating system 108 issues the operation to file system 106 that has been configured to perform data protection by allowing different levels of access to protected content based on security parameters. By integrating data protection directly into the file system that is the gateway to content, data protection can be more completely implemented in a user-friendly approach. In some embodiments, file system 106 includes a virtual file system that implements data protection features on top of a traditional file system that provides access to data storage. In some embodiments, file system 106 resides in kernel space. A kernel space may manage input/output requests from software and translates them into data processing instructions for the central processing unit and other electronic components of a computer. In some embodiments, users are able to manage activity in kernel space, which is ordinarily inaccessible by users. In some embodiments, in addition to file system 106, an application of user system 102 implements data protection and security features. For example, the application provides a user interface to allow a user to interact with data protection and security features and/or interact with other applications accessing protected files.

Callback module 104 may store and/or provide scripts, policies, and/or code implementing data protection processing to be executed at a given point in time. For example, a file system operation of file system 106 may execute code obtained from the callback module to implement data protection associated with the file system operation and the data being protected. Code from the callback module may be utilized for pre or post-processing of data, authentication, and other use cases. For example, a user defines a script that dynamically redacts credit card numbers from a protected file when a file system operation to read the protected file is performed. In another example, code of the callback module that gets executed when a file read operation is issued identifies the executable of a process that requested the file read operation and denies access unless the process is on a whitelist of approved applications that can access the protected file. In some embodiments, callback module 104 is stored in admin server 112 and/or access server 110 to prevent unauthorized modification of the stored code.

In some embodiments, an administrator user utilizes admin server 112 to manage data security of one or more user systems (e.g., 102). For example, admin server 112 provides a user interface console to allow the administrator user to set security policies, establish scripts, specify callbacks, manage encrypted storage partitions, view a security log, etc. In some embodiments, a user of user system 102 may utilize admin server 112 to manage data security of user system 102. For example, the user logs in to admin server 112 to access a webpage interface that can be utilized to manage data protection (e.g., set security policies, establish scripts, specific callbacks, manage encrypted storage partitions, view a security log, etc.) of user system 102.

In some embodiments, encryption and/or decryption keys to encrypt and/or decrypt protected data of user system 102 (e.g., stored in storage 116) are provided and/or stored by access server 110. For example, user system 102 requests a decryption key to decrypt protected data when a request to access protected data is received. In some embodiments, access server 110 and admin server 112 are included in the same system.

In some embodiments, mobile device 118 is utilized to authenticate a user of user system 102. For example, mobile device 118 is considered a trusted device of the user of user system 102 and the user inputs a password and/or biometric identification to mobile device 118 to authenticate the user. Once the user is authenticated with mobile device 118, mobile device 118 may be utilized to authenticate the user to user system 102 to allow the user to access protected contents of user system 102. In some embodiments, when a protected content of user system 102 is attempted to be accessed, a notification is provided to mobile device 118 and the authenticated user of mobile device 118 is able to authorize and/or deny the access to the protected content. In some embodiments, physical proximity between user system 102 and mobile device 118 is required when mobile device 118 is utilized to authenticate a user and/or access to protected content. For example, a local wireless connection (e.g., BLUETOOTH) must be established between user system 102 and mobile device 118 and/or a camera of mobile device 118 must capture an identifier displayed on a display of user system 102 to prove physical proximity between user system 102 and mobile device 118.

The components shown in FIG. 1 may be implemented in one or more computers, servers, storage devices, networking components, and/or virtual components/networks. For example, any number of components shown in FIG. 1 may be included in any number of devices. One or more of the following may be included in network 114: a direct or indirect physical communication connection, mobile communication network, Internet, intranet, Local Area Network, Wide Area Network, Storage Area Network, a wireless network, a cellular network, and any other form of connecting two or more systems, components, or storage devices together. Other communication paths may exist and the example of FIG. 1 has been simplified to illustrate the example clearly. Although single instances of components have been shown to simplify the diagram, additional instances of any of the components shown in FIG. 1 may exist. For example, storage 116 may be a distributed storage. In another example, a plurality of user systems is connected to one or more admin server(s) and access server(s). In some embodiments, components not shown in FIG. 1 may also exist.

Figure 2:
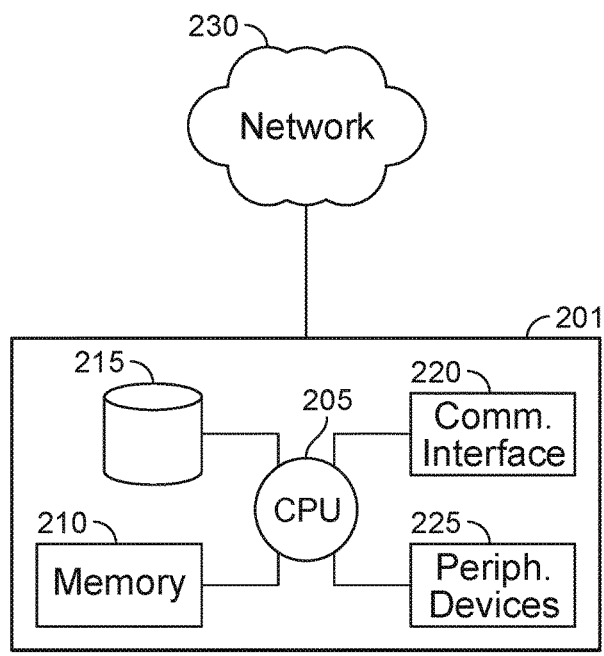
FIG. 2 is a block diagram illustrating an embodiment of computer system 201 that is programmed or otherwise configured to provide a virtual file system layer for the execution of callbacks.

FIG. 2 is a block diagram illustrating an embodiment of computer system 201 that is programmed or otherwise configured to provide a virtual file system layer for the execution of callbacks. In some embodiments, user system 102 of FIG. 1 is included in computer system 201. The computer system 201 includes a central processing unit (CPU, also "processor" and "computer processor" herein) 205, which can be a single core or multi-core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage, and/or electronic display adapters. The memory 210, storage unit 215, interface 220, and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an Internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server.

CPU 205 can execute a sequence of machine-readable instructions, which can be embodied in a program or software. The instructions may be stored in a memory location, such as the memory 210. Examples of operations performed by the CPU 205 can include fetch, decode, execute, and writeback.

Storage unit 215 can store files, such as drivers, libraries, and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

Computer system 201 can communicate with one or more remote computer systems through the network 230. For instance, the computer system 201 can communicate with a remote computer system of a user (e.g., administrator). The remote computer system can be a personal computer (PC). Examples of remote computer systems include mobile or portable PC's, slate or tablet PC's (e.g., Apple® iPad, Samsung® Galaxy Tab), telephones, smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory), or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire, and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, a hard disk, magnetic tape, any other magnetic medium, a CD-ROM, DVD or DVD-ROM, any other optical medium; punch cards/paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display that comprises a user interface (UI) for providing, for example, a user with the ability to generate callbacks. Examples of UIs include, without limitation, a graphical user interface (GUI) and a web-based user interface.

In some embodiments, the computer system 201 is programmed to generate and distribute user-generated extensions. The system can include a library of extensions. Users can select extensions from the library, which can subsequently be added to their virtual file systems. Such extensions can be distributed in a virtual marketplace, such as in a distributed fashion. The system can allow multiple implementation languages, as well as an IDE for creating extensions. The system can include a web-based or graphical user interface. The system can facilitate communication between external data sources and extensions to impact results. For instance, the system can use a geolocation service (e.g., GEOIP) via a network call to determine or approximate the physical location of the user and deny or authorize access to the user based on the results. As another example, the system can perform geofencing of access and have granular control of what type of access is granted (e.g., full read, redacted/augmented read, or zero read).

Figure 3:
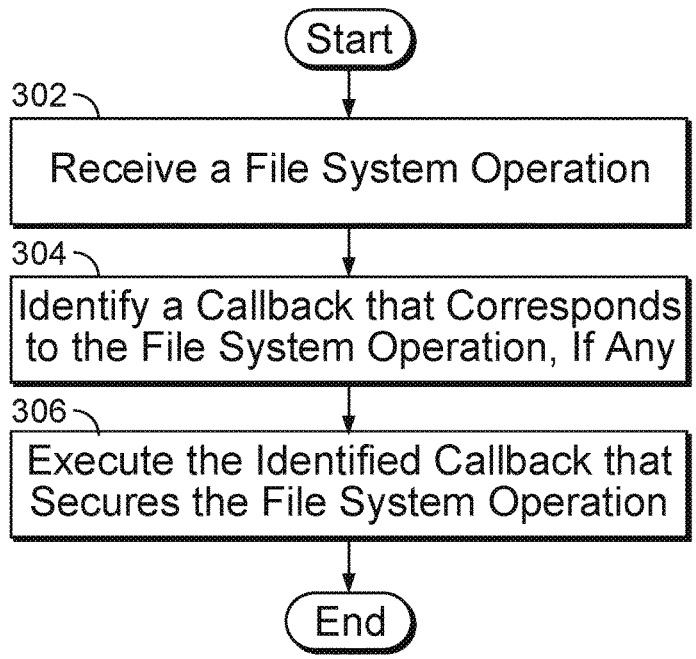
FIG. 3 is a flow chart illustrating an embodiment of a process for securing a file system operation.

FIG. 3 is a flow chart illustrating an embodiment of a process for securing a file system operation. The process of FIG. 3 may be implemented using one or more components of user system 102 of FIG. 1.

At 302, a file system operation is received. In some embodiments, the file system operation is received at a file system from an operating system and/or application. For example, the operating system and/or application requests access to a file to read, modify, and/or delete the file. In some embodiments, the file system operation has been intercepted by a virtual file system that encapsulates operation of one or more underlying file system operations. For example, a base file system has been extended to enable data protection at the file system level. By enabling data protection at the file system operation level, the data protection may be compatible with any application/process without modification to the application/process. In some embodiments, the received file system operation identifies the application and/or process that requested the file system operation and the target file of the file of the file system operation.

At 304, a callback that corresponds to the file system operation, if any, is identified. For example, data protection code that corresponds to the file system operation is identified. In some embodiments, an end user and/or an administrator specifies one or more data protection callbacks to be executed in conjunction with the file system operation. For example, for each type of file system operation, a user is able to specify the specific data protection callback code to be executed for the file system operation type. The callback may be specified to be executed before, after, and/or during the requested file system operation. The callback may be identified based at least in part on a type of the file system operation, a user of the file system operation, a requesting application/process of the file system operation, and/or a target file of the file system operation. For example, only certain target files that are to be protected are to be processed by the callback to protect the protected files. In some embodiments, the callback that corresponds to the file system operation is identified based on a user specified data protection configuration. In some embodiments, the callback is selected from a plurality of eligible user-defined callbacks. For example, a user has defined and identified the callback for the file system operation. In some embodiments, the callback was selected for the file system operation from a plurality of predefined callbacks provided to a user. In some embodiments, one or more callbacks to be executed for the file system operation are configurable, reconfigurable, definable, and/or customizable.

At 306, the identified callback that secures the file system operation is executed. The callback may be executed before, after, and/or during the underlying file system operation requested (e.g., underlying file read, write, close, open, delete, etc.). In some embodiments, executing the callback includes decrypting a target file of the file system operation. In some embodiments, the callback may disallow file access if a target file has been identified as a protected file. In such a case, access may be disallowed until a third party has authorized access. The appropriate response is then sent to the operating system. For example, upon reading a file, a callback code can scan the data and determine if a given type of data (e.g., personally identifiable information, or PII) exists. If it does exist, then another callback redacts the given type of data by replacing it with other data, character (s), or a string of characters (e.g., Xs). Another callback may also deny reads entirely based on physical location of the user or time of access. In some embodiments, the file system operation has been secured because the callback/code that secures the file system operation is configured to be executed for the file system operation.

Figure 4:
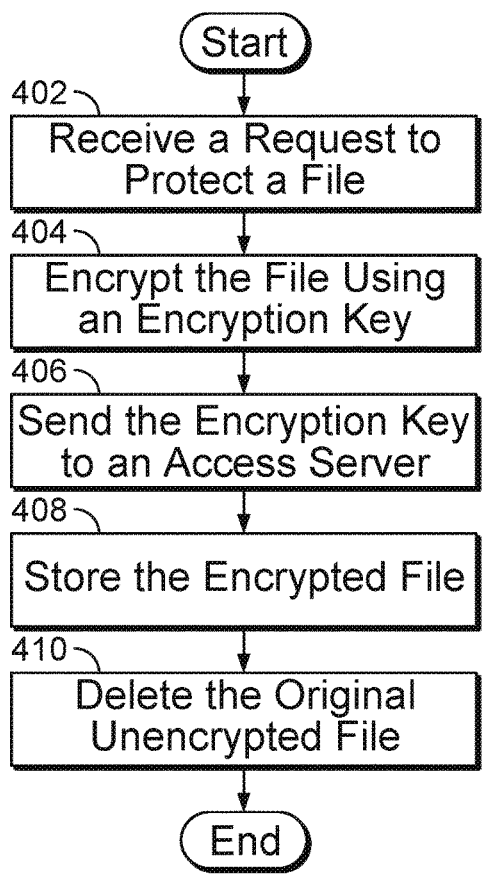
FIG. 4 is a flow chart illustrating an embodiment of a process for specifying a file to be protected.

FIG. 4 is a flow chart illustrating an embodiment of a process for specifying a file to be protected. The process of FIG. 4 may be implemented using one or more components of user system 102 of FIG. 1.

At 402, a request to protect a file is received. In some embodiments, not all files of a storage are protected. For example, because protecting a file utilizes resources, only those files that are identified to be protected are protected. In some embodiments, the request is received from an end user of the protected file. For example, the request is received from a user of user system 102 of FIG. 1. In some embodiments, the request is received via a selection of a context menu associated with the file. For example, a user selects (e.g., "right clicks") a user interface representation of the file (e.g., icon of the file in a directory) to display a context menu and the user selects an item of the context menu that indicates that the file should be protected. In some embodiments, the request indicates a type and/or level of protection to be applied to the file. For example, a certain file may require a high level of protection that requires full authentication of a specified user before allowing access to any portion of the file, while another file may require a lower level of protection that allows some access to a portion of the file for unauthorized users.

At 404, the file is encrypted using an encryption key. In some embodiments, a different encryption key is generated for each file to be protected. In some embodiments, the encryption key is utilized to perform symmetric encryption. In some embodiments, the encryption key is utilized to perform asymmetric encryption (e.g., public key cryptography). In some embodiments, a plurality of encryption keys is utilized to encrypt multiple levels of protection of varying access levels for the same protected file. For example, a first encryption key is utilized to encrypt a full not redacted version of the file and a second encryption key is utilized to encrypt a redacted version of the file. Various versions of varying levels of redactions may be encrypted using different encryption keys. By providing a decryption key that only decrypts the version to be granted access, varying levels of access to the protected file may be granted. In some embodiments, the encrypted file may be encrypted in a manner such that a portion of the file (e.g., redacted version) can be obtained from the encrypted file without decrypting the encrypted file.

At 406, the encryption key is sent to an access server. In some embodiments, the encryption is also the decryption key of the file and by not storing the encryption key with the encrypted file, security of the file is protected. The access server (e.g., server 110 of FIG. 1) may receive the encryption key and store the encryption key. The access server may later provide the encryption key to decrypt the encrypted file when requested if the request to access the file is authorized.

At 408, the encrypted file is stored. In some embodiments, the encrypted file is stored in a separate logical volume of a storage from the original volume where unprotected files, including the original file, are stored. For example, a large encrypted volume file includes contents of various encrypted files and the encrypted file is stored within the large encrypted volume file. In some embodiments, the encrypted file is stored in a separate physical volume of a storage from the volume where unprotected files are stored. In some embodiments, by storing the encrypted file at a user storage rather than at a remote storage, faster access to the encrypted file may be achieved. In some embodiments, the encrypted file may be freely copied, backed up, sent, and otherwise distributed and/or accessed without compromising the protected access to the file because the file has been encrypted. In some embodiments, the encrypted file includes metadata that identifies which encryption key may be utilized to decrypt the encrypted file. For example, a file system is able to determine which key must be obtained to decrypt the file by reading the metadata of the file.

At 410, the original unencrypted file is deleted. By deleting the original file, only the encrypted version of the file remains to prevent unauthorized access using the original unencrypted file.

Figure 5:
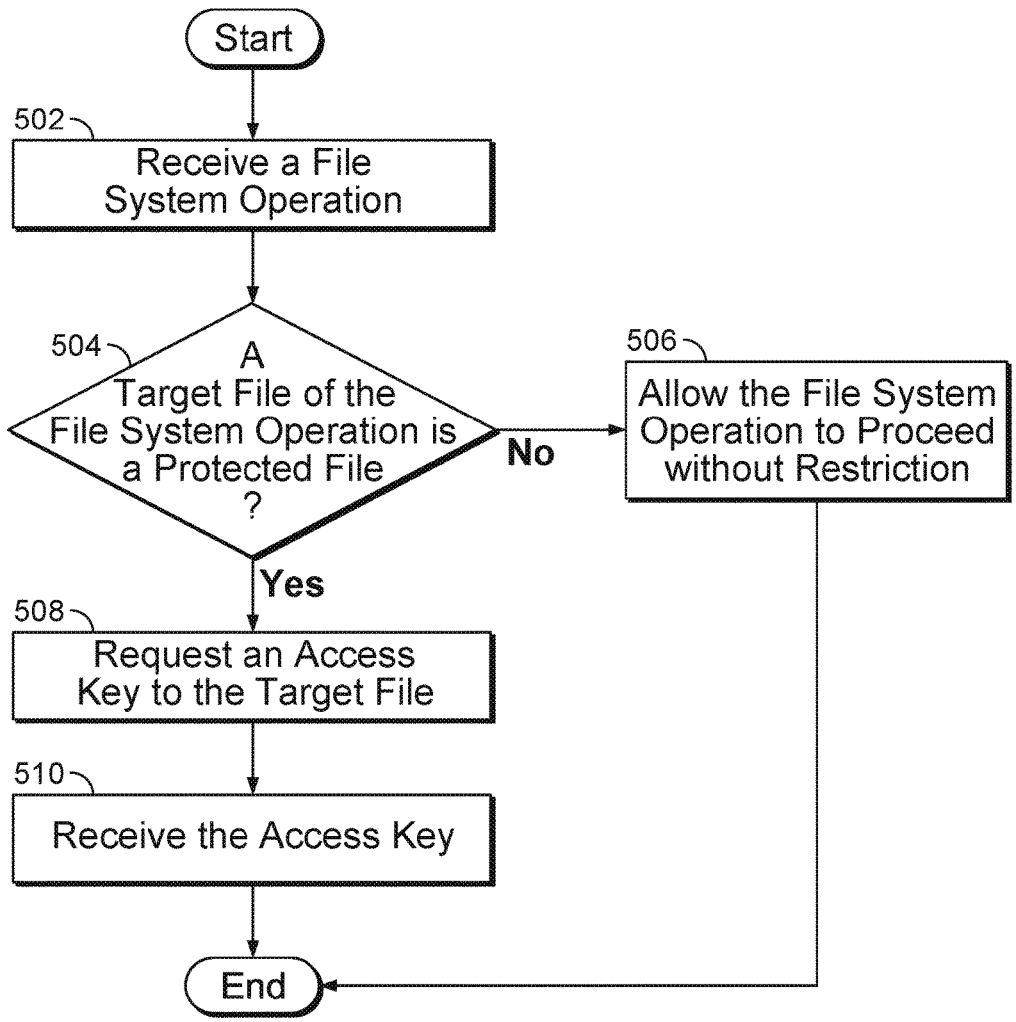
FIG. 5 is a flow chart illustrating an embodiment of a process for accessing a protected file.

FIG. 5 is a flow chart illustrating an embodiment of a process for accessing a protected file. The process of FIG. 5 may be implemented using one or more components of user system 102 of FIG. 1. In some embodiments, the process of FIG. 5 is included in 306 of FIG. 3. For example, the callback of 306 performs at least a portion of the process of FIG. 5.

At 502, a file system operation is received. In some embodiments, the file system operation is the file system operation received in 302 of FIG. 3.

At 504, it is determined whether a target file of the file system operation is a protected file. In some embodiments, the target file is a protected file if the file has been protected using the process of FIG. 4. In some embodiments, the target file is a protected file if the file has been identified as access restricted. In some embodiments, determining whether the target file is a protected file includes analyzing a metadata, if any, of the protected file that identifies the target file as a protected file. For example, even a protected target file that has been received as an email attachment from another user system can be automatically accessed by a recipient, if authorized, by allowing the recipient to automatically decrypt the protected target file based on information included in the metadata of the protected target file.

If at 504 it is determined that the target file is not a protected file, at 506, the file system operation is allowed to proceed without restriction. For example, the file system operation is allowed to be processed using an underlying file system without extra processing by a virtual file system to protect the protected files. In some embodiments, the file system operation is allowed to proceed without performing a callback that secures the file system operation.

If at 504 it is determined that the target file is a protected file, at 508, an access key to the target file is requested. In some embodiments, the access key is requested from a remote server (e.g., from access server 110 of FIG. 1). In some embodiments, the access key can be utilized to decrypt the target file. In some embodiments, the request for the access key identifies the process/application that requested the target file, user that requested the target file, identification of the requested access key, a type of access requested, the type of file system operation, and/or other information that may be utilized to determine whether to grant access to the target file. In some embodiments, the access key to the target file is requested using information included in a metadata of the target file. For example, the metadata may specify the identifier of the access key required to access the target file.

At 510, the access key is received, the access key is utilized to decrypt the target file, and the file system operation is performed using the decrypted target file. The access key may only access the portion of the target file that has been granted. Different access keys may be able to decrypt/unlock a different version/amount of the target file. By allowing the file system operation to automatically handle data protection, any application of a user may be able to utilize the protected files without modifying the application and/or requiring a user to perform extra steps each time access to the protected file is desired because the file system operation is requested and completed as normal.

Figure 6:
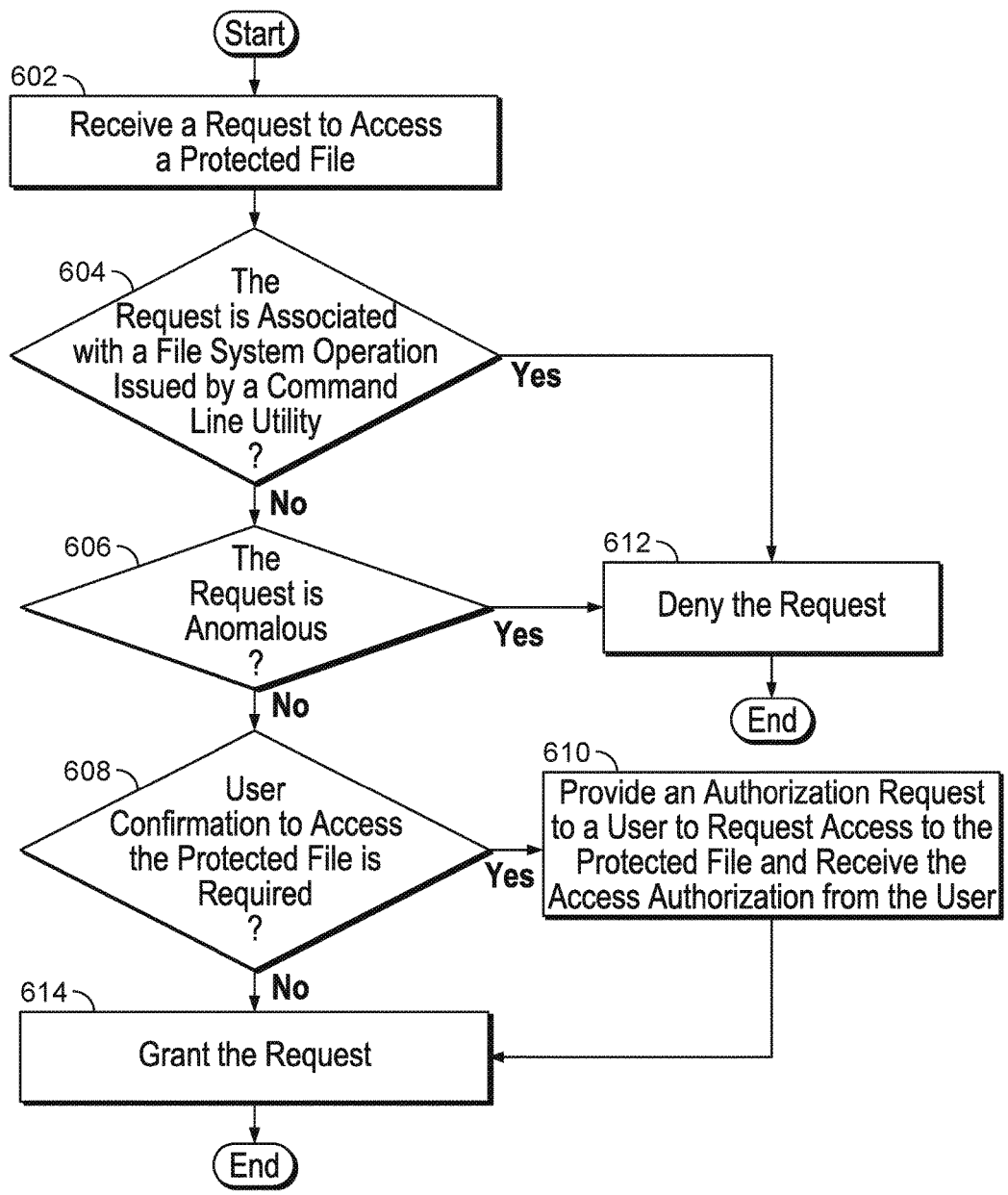
FIG. 6 is a flow chart illustrating an embodiment of a process for providing access to a protected file.

FIG. 6 is a flow chart illustrating an embodiment of a process for providing access to a protected file. The process of FIG. 6 may be implemented using one or more components of access server 110 of FIG. 1.

At 602, a request to access a protected file is received. In some embodiments, the request is the request for the access key in 508 of FIG. 5.

At 604, it is determined whether the request is associated with a file system operation issued by a command line utility. For example, often malware utilizes a command line utility to access files while a user rarely, if ever, accesses files using the command line utility. By disallowing any access to protected files using the command line utility, some forms of malware attacks may be prevented. In some embodiments, only file system operations by signed applications/processes to a protected file are allowed. If at 604 it is determined that the request is associated with a file system operation desired by a command line utility, the process proceeds to 612.

If it is determined at 604 that the request is not associated with a file system operation issued by a command line utility, at 606, it is determined whether the request is anomalous. A server may perform analysis using various historical and other data to determine whether the request is anomalous. For example, various types of information such as how the protected file or another related file has been used in the past by the requesting user and other users, an amount of data that has been accessed by a user within an amount of time (e.g., request is anomalous if the user has been requesting/accessing a large amount of data within a short amount of time), an organization/group/domain of a system and/or user of the request (e.g., request is anomalous if a user belonging to one organization is sending to a system in another prohibited destination organization), a geographical location of where the request was made, a time when the request was made, a historical frequency of the request, a type of content of the protected file, the application/process that requested a file system operation associated with the request, a context of the request, and other information about the request are analyzed by a server to make an assessment of the likelihood the request is an authorized request that should be granted. If the likelihood is greater than a threshold, the request may be determined to be not anomalous. If at 606 it is determined that the request is anomalous, the process proceeds to 612. If at 606 it is determined that the request is not anomalous, the process proceeds to 608. At 612, the request is denied. In some embodiments, rather than denying the request, limited access to the protected file is granted. For example, a limited access to a redacted version of the protected file is provided.

At 608, it is determined whether user confirmation to access the protected file is required. In some embodiments, certain types of protected files, requests, file operations, and/or requests associated with certain users (e.g., explicitly defined by rule or automatically determined) may require user confirmation prior to granting the access while others may not require the user confirmation. If at 608 it is determined that user confirmation to access the protected file is required, at 610, an authorization request is provided to a user to request access to the protected file and the access authorization is received from the user. For example, a specific user has been configured as the owner of the protected file and a mobile device or another system of the specific user is notified to request a permission from the user to grant access to the protected file. The user may grant and/or deny access using the mobile device. The user may be required to be authorized before being allowed to grant or deny access. In some embodiments, the user may specify a type and/or level of access to be granted.

If at 608 it is determined that user confirmation to access the protected file is not required, or an authorization request to a user to request access to the protected file and receive the access authorization from the user is provided, at 614, the request is granted. In some embodiments, granting the request includes providing an access encryption/decryption key that can be utilized to unlock appropriate access to the protected content. In some embodiments, there exist multiple levels and/or types of access that can be granted and the access key that matches the type/level to be granted is provided. In some embodiments, the type of access to be granted is based at least in part on a type of content of the protected file, the application/process that requested a file system operation associated with the request, and/or other information about the request. For example, different types of access are granted based on which application/process requested the file system operation associated with the request.

Figure 7:
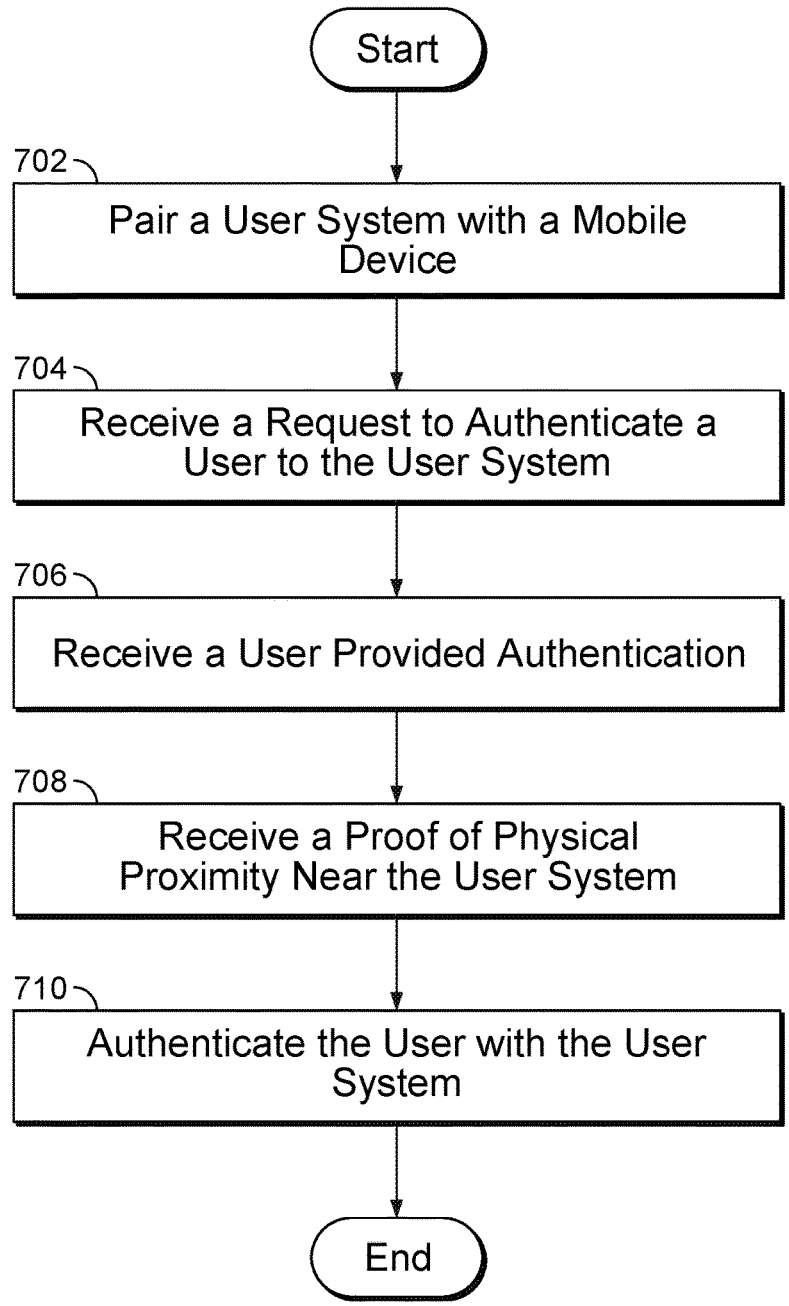
FIG. 7 is a flow chart illustrating an embodiment of a process for authenticating a user with a user system using a mobile device.

FIG. 7 is a flow chart illustrating an embodiment of a process for authenticating a user with a user system using a mobile device. The process of FIG. 7 may be implemented using one or more components of mobile device 118 of FIG. 1. In some embodiments, the process of FIG. 7 may be utilized to authenticate a user desiring to access and/or grant access to protected content. By utilizing a mobile device to authenticate a user with a user system, security benefits of two-factor authentication, biometric authentication, and/or physical proximity authentication may be achieved.

At 702, a user system is paired with a mobile device. Examples of the mobile device include a cellphone, a smartphone, a tablet computer, a smart watch, and any other portable and/or wearable computer. In some embodiments, pairing the user system with a mobile device includes associating together the user system with a mobile device to allow the mobile device future authentication of the user with the user system.

At 704, a request to authenticate a user to the user system is received. In some embodiments, the user indicates using the mobile device that the user desires to authenticate the user to the user system. In some embodiments, by authenticating the user to the user system, the user is able to access a protected file of the user system.

At 706, a user provided authentication is received. In some embodiments, the user provided authentication includes a password and/or a biometric authentication (e.g., fingerprint authentication received using a fingerprint reader, facial' recognition received using a camera, etc.).

At 708, a proof of physical proximity near the user system is received. In some embodiments, the receiving the proof includes receiving a proof of physical proximity between the user system and the mobile device. For example, a local wireless connection (e.g., BLUETOOTH) must be established between the user system and the mobile device and/or a camera of the mobile device must capture an identifier displayed (e.g., barcode, QR (Quick Response) code, etc.) on a display of the user system.

At 710, the user is authenticated with the user system. In some embodiments, by being authenticated, the user is granted less restrictive access to protected content using the user system. In some embodiments, the mobile device that is associated with an authenticated user is able to control access to one or more protected files on a separate user system. For example, when a protected file of a user is attempted to be accessed (e.g., by a user system or by a recipient of a protected file sent by the user), the user may grant, deny, or modify access to the protected file via the mobile device.

Figure 8:
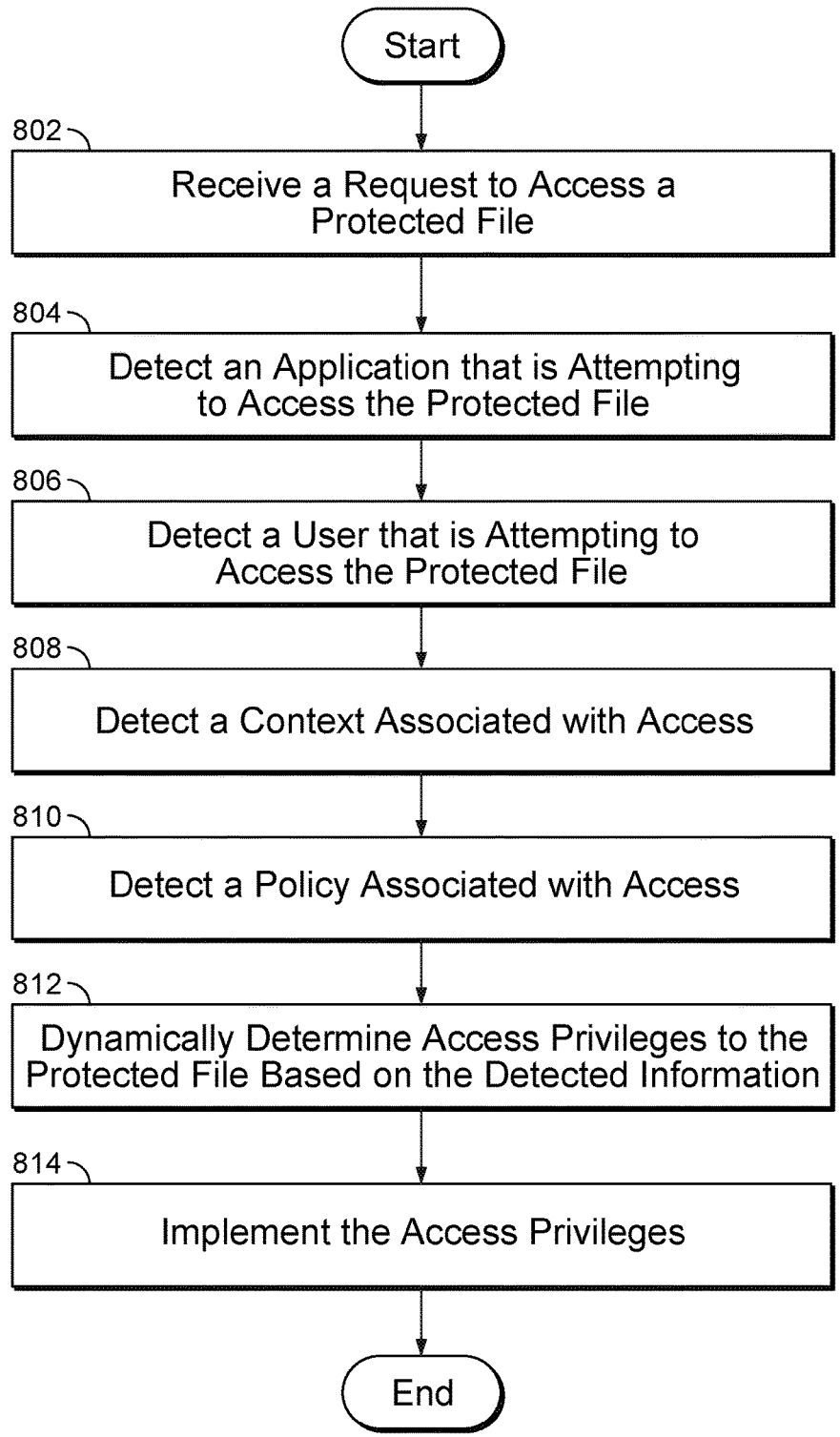
FIG. 8 is a flow chart illustrating an embodiment of a process for determining access privileges to a protected file.

FIG. 8 is a flow chart illustrating an embodiment of a process for determining access privileges to a protected file. The process of FIG. 8 may be implemented using one or more components of access server 110 and/or user system 102 of FIG. 1. In some embodiments, the process of FIG. 8 is included in 606 and/or 608 of FIG. 6. For example, the process of FIG. 8 is utilized to determine whether to deny a request, a type of access to be granted, and/or authorization required to obtain the access. In some embodiments, at least a portion of the process of FIG. 8 is included in 504 of FIG. 5.

At 802, a request to access a protected file is received. In some embodiments, the request includes the file system operation in 502 of FIG. 5 and/or the request received in 602 of FIG. 6. In some embodiments, the request is a request received by an operating system and/or a virtual file system from a user application that desires to access the protected file. The request may include a request to read, modify, copy, delete, move, and/or otherwise interact with the protected file.

At 804, an application that is attempting to access the protected file is detected. For example, capabilities and potential security breach risks differ for different applications and identification of the application that is attempting to access the protected file is determined to access the security risk of the access. In some embodiments, detecting the application includes determining an identifier of the application, a version of the application, a type of the application, an integrity of the application, and/or other information associated with the application.

At 806, a user that is attempting to access the protected file is detected. For example, potential security breach risks differ based on the user(s) associated with the access request, a destination of the request, and/or a source of the request. In some embodiments, detecting the user associated with the access includes determining one or more identifiers of: one or more users, one or more systems associated with the users, and/or organization(s)/group(s)/domain(s) of the one or more users. For example, a request to send a file from a system/user across different organization entities is associated with a greater security risk than sending within the same organization.

At 808, a context associated with access is detected. Examples of the context include historical information of access of the protected file or another related file, an amount of data that has been accessed within an amount of time, a geographical location of where the request was made, a time when the request was made, a historical frequency of the request, a type of content of the protected file, and other information associated with the use context of the protected file.

At 810, a policy associated with access is detected. Examples of the policy include one or more rules and/or access policies that are applicable to the protected file. The rule/policy may have been set by a user or an administrator for the specific protected file, a group of protected files, a user, a group of users, an organization or other groupings associated with the protected file, etc. The policy may specify a policy regarding which type of access to grant for which specific situation. For example, a network administrator has specified a policy that protected content cannot be copied to a new storage location without explicit authorization from the network administrator.

At 812, access privileges to the protected file are dynamically determined based on the detected information. For example, information detected in 804-810 is utilized to determine whether the received request is to be allowed and an amount/type of access to the protected file to be granted. The request may be denied or the request may be allowed with full privileges, read-only privileges, redacted access only privileges, etc. In some embodiments, the access privilege identifies one or more actions and/or conditions required to allow the access to the protected file. For example, a user confirmation (e.g., via a mobile device) that the access should be granted is required to grant the request. In some embodiments, based on the detected information, one or more questions are generated and provided to a user for response. The questions probe the likely desired access policy for the protected content and using at least the response, the access privileges to the protected file are dynamically determined. The dynamically determined access privileges for the protected file may be saved and at least in part utilized to handle future access requests for the protected content.

At 814, the access privileges are implemented. In some embodiments, implementing the access privilege includes granting or denying the access request. For example, in the event the access is to be granted, a decryption key matching the type/amount of access granted is provided/obtained. In some embodiments, implementing the access privilege includes providing an authorization request to a user (e.g., to a mobile device of the user).

Figure 9:
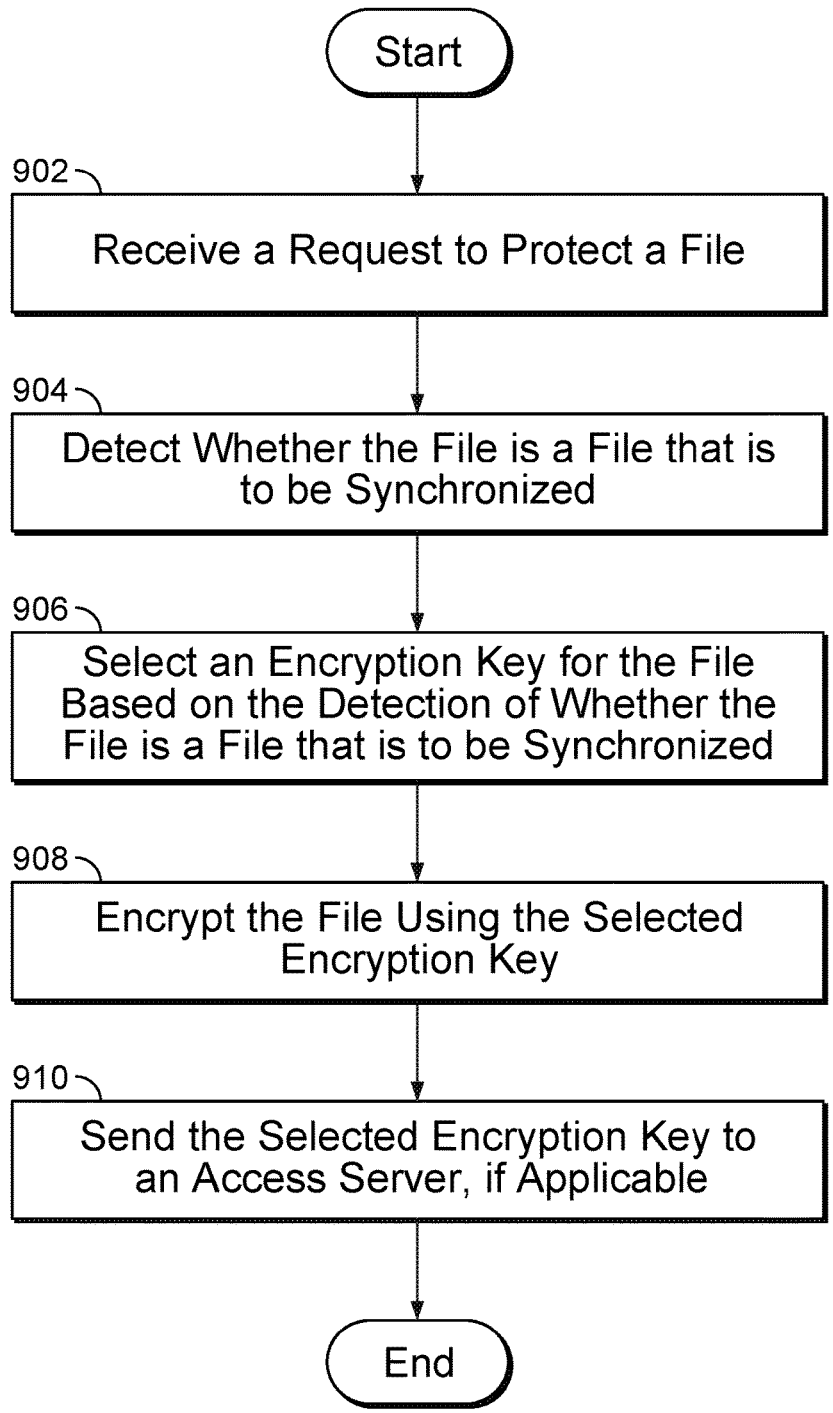
FIG. 9 is a flow chart illustrating an embodiment of a process for dynamically selecting an encryption key.

FIG. 9 is a flow chart illustrating an embodiment of a process for dynamically selecting an encryption key. The process of FIG. 9 may be implemented using one or more components of user system 102 of FIG. 1. For example, a virtual file system and one or more callback modules included in user system 102 perform at least a portion of the process of FIG. 9. In some embodiments, at least a portion of the process of FIG. 9 is performed when performing the process of FIG. 8. In some embodiments, at least a portion of the process of FIG. 9 is included in 306 of FIG. 3.

At 902 a request to protect a file is received. For example, a request to save a file to storage as a protected file is received. In some embodiments, the request is the request received in 402 of FIG. 4. For example, not all files of a storage are protected. For example, because protecting a file utilizes resources, only those files that are identified to be protected are protected. In some embodiments, the request is received from an end user of the protected file. For example, the request is received from a user of user system 102 of FIG. 1. In some embodiments, the request is received via a selection of a context menu associated with the file. For example, a user selects (e.g., "right clicks") a user interface representation of the file (e.g., icon of the file in a directory) to display a context menu and the user selects an item of the context menu that indicates that the file should be protected. In some embodiments, the request indicates a type and/or level of protection to be applied to the file. For example, a certain file may require a high level of protection that requires full authentication of a specified user before allowing access to any portion of the file, while another file may require a lower level of protection that allows some access to a portion of the file for unauthorized users. In some embodiments, the request is received from an application that indicates the type and/or use for the file and the type of protection requested for the file. In some embodiments, the request indicates whether the file is a file to be synchronized with another copy of the file. In some embodiments, the request is a request to save and/or send a file to a remote location for storage/synchronization. For example, the file is to be uploaded to an online file sharing/collaboration service.

At 904, it is detected whether the file is a file that is to be synchronized. In some embodiments, the received request indicates whether the file is a file that is to be synchronized and the detection is based at least in part on the indication. In some embodiments, the detection is automatic. For example, based at least in part on information about the request and/or the file to be protected (e.g., based on detected information about the application, user, context, policy, etc., such as information detected in 804-810 of FIG. 8), it is determined automatically whether the file is a file that is to be synchronized. In some embodiments, in the event the request is based on an application (e.g., installed application, mobile application, web application, website, etc.) that is known to synchronize data (e.g., collaboration application, notetaking application, backup application, cloud storage application, etc.), the file is determined as a file to that is to be synchronized. In some embodiments, detecting whether the file is a file that is to be synchronized includes analyzing a filename of the file. For example, the filename is analyzed to determine whether the filename includes a known pattern associated with synchronization and/or the filename is compared with a list of known filenames associated with files that are to be synchronized. In some embodiments, a use context of the file is detected and utilized to detect whether the file is a file that is to be synchronized. For example, a website that provided the file for storage and/or is a destination of the file is detected and if the website is associated with file synchronization, it is automatically detected that the file is a file that is to be synchronized.

At 906, an encryption key for the file is selected based on the detection of whether the file is a file that is to be synchronized. For example, if the file to be protected is a file that is to be synchronized with other copies of the file, all of the copies of the file should be encrypted using the same encryption key to allow incremental synchronization of only the changes rather than requiring the entire file to be synchronized for every minor change (e.g., if copies of the file are encrypted using different keys, the entire contents of each copy will be different rather than only the changed portions). If the file to be protected is a file that is not a file to be synchronized, a unique encryption key for the file may be selected to implement a higher security policy of encrypting each different file using a different key if possible. In some embodiments, selecting the encryption key includes determining and/or receiving a common key for the selected file if the file is to be synchronized. In some embodiments, selecting the encryption key includes generating a new encryption key for the file if the file is not a file to be synchronized. In some embodiments, selecting the encryption key includes receiving the encryption key to be utilized. For example, the encryption is received from an access server and/or encryption key vault. The received encryption key may be received in response to a request for an encryption key associated with the file that is to be synchronized.

At 908, the file is encrypted using the selected encryption key. After the file is encrypted, the file may be stored in a storage, uploaded to a remote network location, and/or sent to a destination via a network. In some embodiments, the encryption key is utilized to perform symmetric encryption. In some embodiments, the encryption is utilized to perform asymmetric encryption (e.g., public key cryptography). In some embodiments, a plurality of encryption keys is utilized to encrypt multiple levels of protection of varying access levels for the same protected file.

In some embodiments, the encrypted file is stored in a separate logical volume of a storage from the original volume where unprotected, files, including the original file, are stored. For example, a large encrypted volume file includes contents of various encrypted files and the encrypted file is stored within the large encrypted volume file. In some embodiments, the encrypted file is stored in a separate physical volume of a storage from the volume where unprotected files are stored. In some embodiments, by storing the encrypted file at a user storage rather than at a remote storage, faster access to the encrypted file may be achieved. In some embodiments, the encrypted file may be freely copied, backed up, sent, and otherwise distributed and/or accessed without compromising the protected access to the file because the file has been encrypted. In some embodiments, the encrypted file includes metadata that identifies which encryption key may be utilized to decrypt the encrypted file. For example, a file system is able to determine which key must be obtained to decrypt the file by reading the metadata of the file.

At 910, the selected encryption key is sent to an access server, if applicable. For example, if it was determined that the file is not a file to be synchronized, the generated encryption key for the file is provided to the access server and if it was determined that the file is a file to be synchronized, the encryption key is not sent to the access server unless the access server does not have the encryption key. In some embodiments, the encryption key is also the decryption key of the file and by not storing the encryption key with the encrypted file, security of the file is protected. The access server (e.g., server 110 of FIG. 1) may receive the encryption key and store the encryption key. The access server may later provide the key to decrypt the encrypted file when requested if the request to access the file is authorized. In an alternative embodiment, rather than sending the encryption key, a decryption key of non-symmetric encryption is sent.

Figure 10:
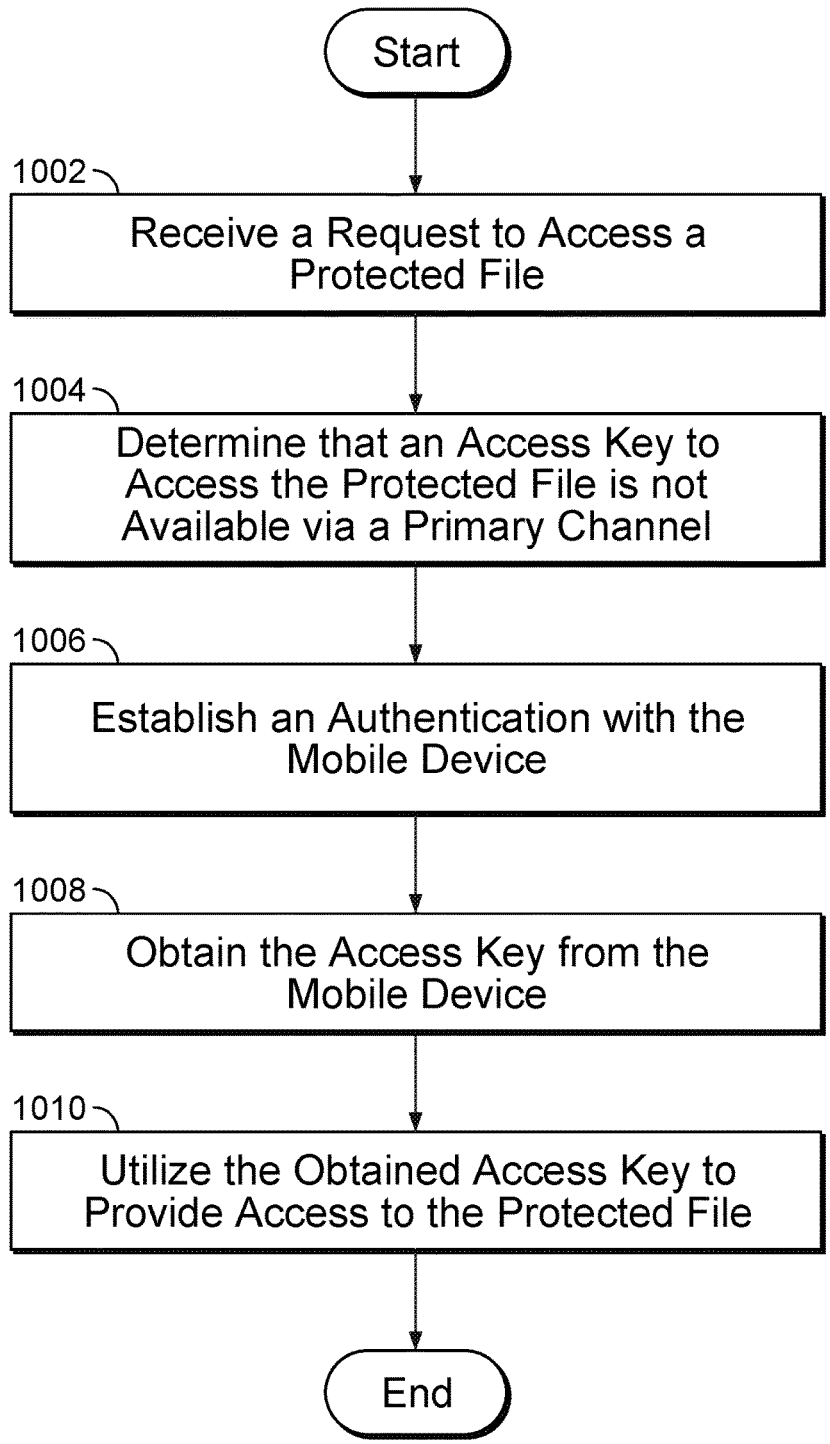
FIG. 10 is a flow chart illustrating an embodiment of a process for obtaining an access key in the event a network connection is unavailable.

FIG. 10 is a flow chart illustrating an embodiment of a process for obtaining an access key in the event a network connection is unavailable. The process of FIG. 10 may be implemented using one or more components of user system 102 of FIG. 1. For example, a virtual file system, an installed encryption management application, and/or one or more callback modules installed on user system 102 perform at least a portion of the process of FIG. 10. In some embodiments, at least a portion of the process of FIG. 10 is included in 306 of FIG. 3. In some embodiments, at least a portion of the process of FIG. 10 is included in 508 of FIG. 5.

At 1002, a request to access a protected file is received. In some embodiments, the request includes the file system operation received in 502 of FIG. 5 and/or the request received in 602 of FIG. 6. In some embodiments, the request is a request received by an operating system and/or a virtual file system from an application that desires to access the protected file. The request may include a request to read, modify, copy, delete, move, and/or otherwise interact with the protected file.

At 1004, it is determined that an access key to access the protected file is not available via a primary channel. For example, the access to the protected file requires the access key (e.g., decryption key) and the access key is typically obtained from an access server (e.g., using the process of FIG. 5). However, in the event a network connection to a remote access is unavailable or the access server becomes unavailable, access to the protected file may become restricted without an alternative way of obtaining the access key. In some embodiments, a user system (e.g., desktop/laptop computer, user system 102 of FIG. 1, etc.) is configured to first attempt to obtain the access keys from a remote networked access server (e.g., access server 110). It may be determined that the access key to access the protected file is not available via the primary channel to the remote networked access server because an Internet connection is unavailable to the user system or access server 110 is unresponsive/unreachable. This determination that that the access key to access the protected file is not available via a primary channel may be at least in part determined by a virtual file system, a data protection/encryption application of the user system, and/or a callback module.

At 1006, an authentication is established with the mobile device. For example, in order to provide a backup location where the access key may be obtained, a secondary device of the user is utilized as the source of the access key for the user system.

Examples of the mobile device include a cellphone, a smartphone, a tablet computer, a smart watch; and any other portable and/or wearable computer. In some embodiments, establishing the authentication includes pairing a user system requesting the access key with the mobile device of the user. In some embodiments, pairing the user system with a mobile device includes associating together the user system with a mobile device to allow the mobile device to authenticate the identity and physical proximity of the user with the user system. In some embodiments, pairing the user system with the mobile device includes establishing a communication between the user system and the mobile device. The connection may be a wired connection or a wireless connection. For example, a cable connects the user system with the mobile device. In another example, a wireless connection such as WIFI, BLUETOOTH, or other type of direct wireless connection is established between the user system and the mobile device.

In some embodiments, establishing the authentication includes validating that an authorized mobile device is connected to a user system. For example, an identifier of a mobile device of a user has been preconfigured to a user system and it is determined that the preconfigured mobile device that is identified by the identifier is connected to the user system. In some embodiments, establishing the authentication includes verifying that a user has authenticated an identity of the user with the mobile device. For example, the user has provided a valid authentication that includes a password and/or a biometric authentication (e.g., fingerprint authentication received using a fingerprint reader, facial recognition received using a camera, etc.). In some embodiments, by authenticating the user to the mobile device/user system, the user is able to authorize access to a protected file of the user system.

In some embodiments, establishing the authentication includes validating a physical proximity between the user system and the mobile device. For example, a local wireless connection (e.g., BLUETOOTH) must be established between the user system and the mobile device and/or a camera of the mobile device must capture an identifier displayed (e.g., barcode, QR code, etc.) on a display of the user system. In some embodiments, a detected physical location of the device is utilized to validate a physical proximity between the user system and the mobile device (e.g., location determining using GPS, cellular/tower signal triangulation, WIFI location triangulation, etc. of the mobile device).

At 1008, the access key is obtained from the mobile device. In some embodiments, the mobile device receives an identifier of the file attempted to be accessed and provides an indication to a user to allow or deny the request. When the user approves the request on the mobile device, the access key for the file is provided to a user system of the request and if the user does not approve the request, the access key is not provided. In some embodiments, the access key has been stored/cached on the mobile device. In some embodiments, the mobile device requests and obtains the access key via a remote access server accessed using a network connection of the mobile device. For example, an Internet connection of the mobile device is utilized when an Internet connection of the mobile device is not available. In some embodiments, the access key is only provided if it is determined that the request has been identified to be granted using at least a portion of the processes of FIG. 6 and/or FIG. 8. For example, if the request has been automatically determined to be anomalous or fits a profile of a request defined by an administrator to be not allowable, the request is automatically denied by a user system and/or a mobile device.

At 1010, the obtained access key is utilized to provide access to the protected file. For example, the obtained access is utilized to decrypt the protected file. In some embodiments, the obtained access key is utilized to access a locally stored key storage of a user system. For example, the access key is utilized to unlock/decrypt a key storage stored on a local storage of the user system.

Figure 11:
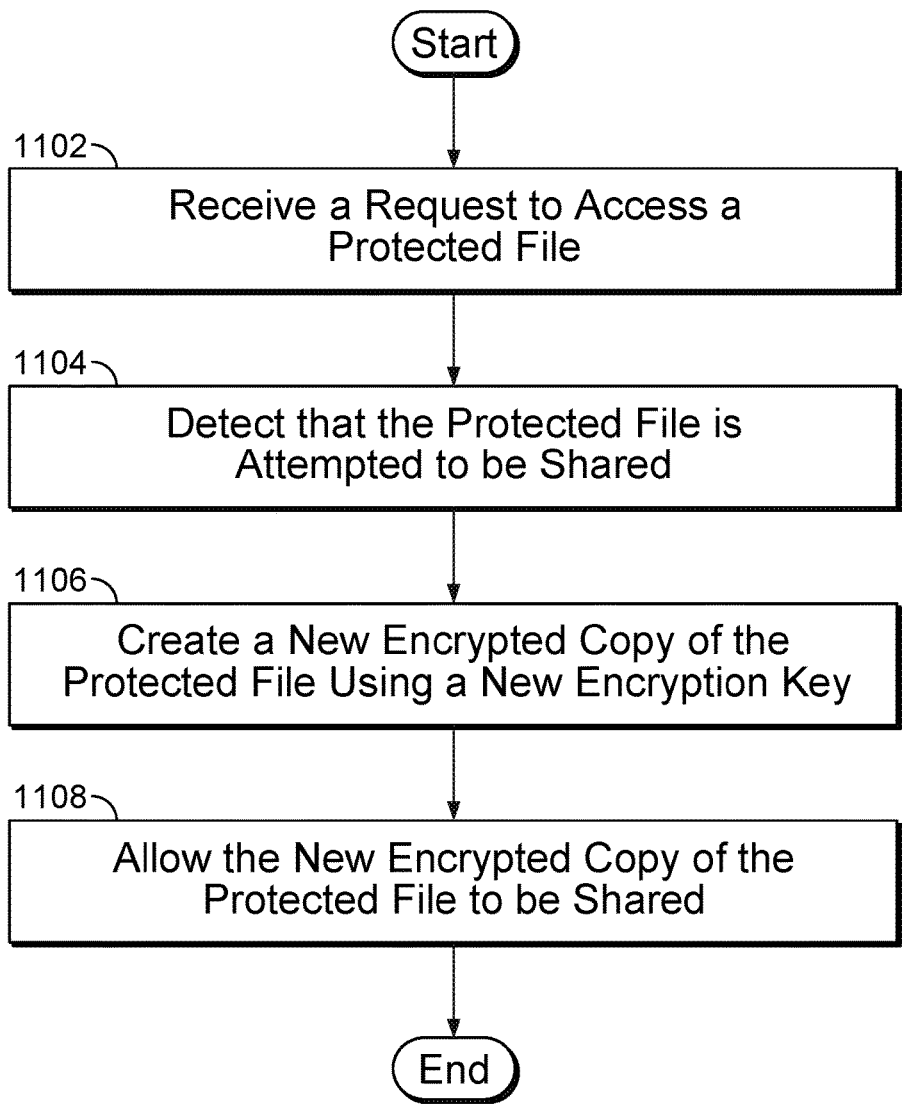
FIG. 11 is a flow chart illustrating an embodiment of a process for sharing a protected file.

FIG. 11 is a flow chart illustrating an embodiment of a process for sharing a protected file. The process of FIG. 11 may be implemented using one or more components of user system 102 of FIG. 1.

At 1102, a request to access a protected file is received. In some embodiments, the request includes the file system operation received in 502 and/or the request received in 502 of FIG. 5. In some embodiments, the request is a request received by an operating system and/or a virtual file system from a user application that desires to access the protected file. The request may include a request to read, modify, copy, move, and/or otherwise interact with the protected file.

At 1104, it is detected that the protected file is attempted to be shared. In some embodiments, the received request indicates whether the request is associated with sharing the protected file. For example, based at least in part on information about the request and/or the file (e.g., based on detected information about the application, user, context, policy, etc., such as information detected 804-810 of FIG. 8), it is determined automatically whether the file is a file that is attempted to be shared. In some embodiments, in the event the request is based on an application (e.g., installed application, mobile application, web application, website, etc.) that is associated with sharing data (e.g., email application, messaging application, web browser application, etc.), the file is determined as a file that is attempted to be shared. In some embodiments, detecting whether the file is a file that is attempted to be shared includes detecting that the file is requested to be copied and/or read by an application that is known to be utilized for sharing data. In some embodiments, detecting whether the file is a file that is attempted to be shared includes detecting an operation and/or state of an application. For example, it is detected that the file is attempted to be attached to an email message. In some embodiments, it is determined in 1104 whether to grant the request using at least a portion of the process of FIG. 6. In the event it is determined to deny the request, the process ends and the process does not proceed to 1106.

At 1106, a new encrypted copy of the protected file is created using a new encryption key. For example, a separate copy of the protected file is generated and encrypted using a new encryption key. By utilizing a different encryption key for a different copy of the data to be shared, the protection for the copy can be individually customized and controlled. In some embodiments, creating the new encrypted copy includes generating a new encryption key, encrypting a copy of the protected file using the encryption key, and storing/sending the encryption key (and/or a corresponding decryption key) to an access server. In some embodiments, a type of access to be granted for the protected file when being shared is dynamically determined based on a detected application, a user, a use context, and/or a policy associated with the sharing request and the protected file (e.g., determined in 812 of FIG. 8). For example, if it is determined that the protected file is being shared between two trusted parties of the same organization, instead of generating the encrypted copy, the protected file is not encrypted prior to being shared. In another example, a type of encryption and/or amount of data to be encrypted (e.g., amount of data to be redacted) is dynamically determined based on detected data about the received request and the protected file.

At 1108, the new encrypted copy of the protected file is allowed to be shared. For example, rather than allowing the original encrypted copy to be shared, the new encrypted copy of the file is allowed to be shared. In some embodiments, the originator of the encrypted file retains control over access of the file even after the protected file has been shared or sent to another user. For example, a recipient of the encrypted copy cannot access an unencrypted version of the encrypted copy of the file without utilizing a file system and/or application (e.g., file system 106 and callback module 104 of FIG. 1) configured to enforce security of the protected file. In some embodiments, when the recipient attempts to access the copy of the protected file, the recipient requests a decryption key from a remote access server. The originator of the protected file is notified of the attempted access from the access server and, if appropriate (e.g., pursuant to an established or automatically generated security rule), the originator may indicate to allow or deny the access of the recipient. Even while the recipient is utilizing the copy of the protected content, the original may retain the ability to send an instruction to a virtual system and/or an application managing the security of the copy of the protected file on the recipient's system to dynamically revoke the previously granted access. If the recipient desires to share the copy of the protected file with yet another user, the originator of the protected file may authorize or deny the attempt to share and if the copy is shared with another user (e.g., a second copy of the protected file is generated using a new encryption key for sharing to a second user), the originator may also retain separate notification and security control of the second copy of the protected file of the new second recipient as well. In some cases, the intermediary recipient/sender of the second copy may also have at least some notification and security control of the second copy.

Figure 12:
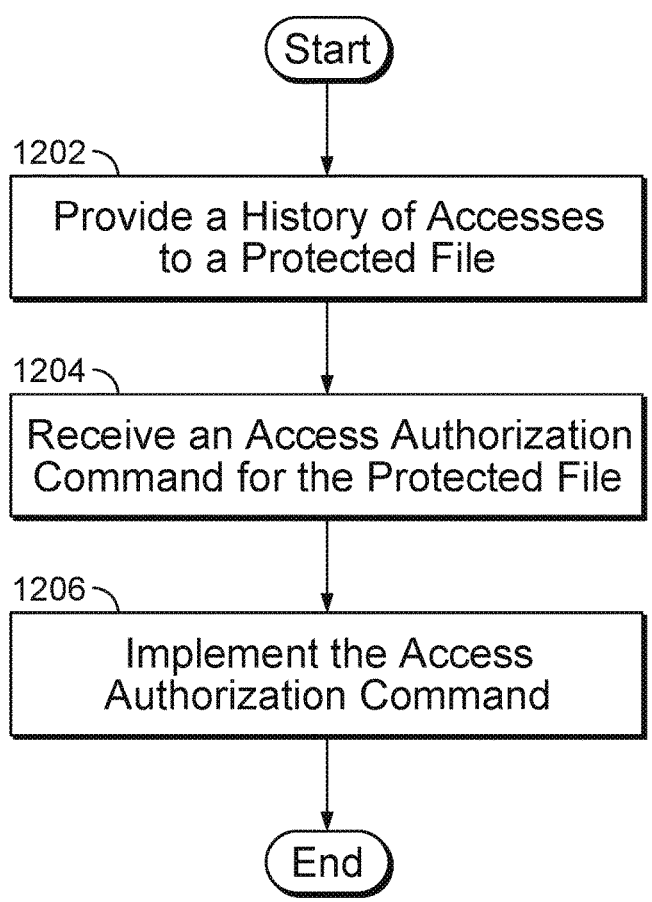
FIG. 12 is a flow chart illustrating an embodiment of a process for processing an access authorization command.

FIG. 12 is a flow chart illustrating an embodiment of a process for processing an access authorization command. The process of FIG. 12 may be implemented using one or more components of user system 102 and/or mobile device 118 of FIG. 1.

At 1202, a history of accesses to a protected file is provided. For example, a list of previous accesses to the protected file (e.g., including a type of access, a user identifier that accessed the file, a system identifier of the system that accessed the file, a time/date of the access, and a current state of the access) is provided. In some embodiments, each time a protected file is accessed (e.g., using at least a portion of any of the processes disclosed in the specification) or an access property of the protected file is changed, the access/change is logged and the log is accessible to one or more users that have control over the security of the protected file. The history of access may be provided on an individual file basis and/or for a plurality of protected files (e.g., in chronological order of access history).

At 1204, an access authorization command for the protected file is received. In some embodiments, a list of previous accesses for the protected file is provided and a user may select an item of the list to grant, deny, modify, alter, or revoke an access associated with the selected access. In some embodiments, there exists at least two user interfaces to grant, deny or modify an access authorization of a protected file. For example, a user may grant, deny, or modify an access authorization using an application of a user system or another application of a mobile device. In some embodiments, certain access authorizations can only be performed using the mobile device as compared to the user system. For example, any access authorization required to grant new/additional access privileges must be confirmed/instructed using the mobile device (e.g., mobile device is deemed to be more secure) while any access authorization that reduces or removes/denies access may be confirmed/indicated using either the user system or the mobile device.

At 1206, the command is implemented. For example, a virtual file system and/or an application configured to manage security of the protected file is provided the command to implement the provided command.

Figure 13:
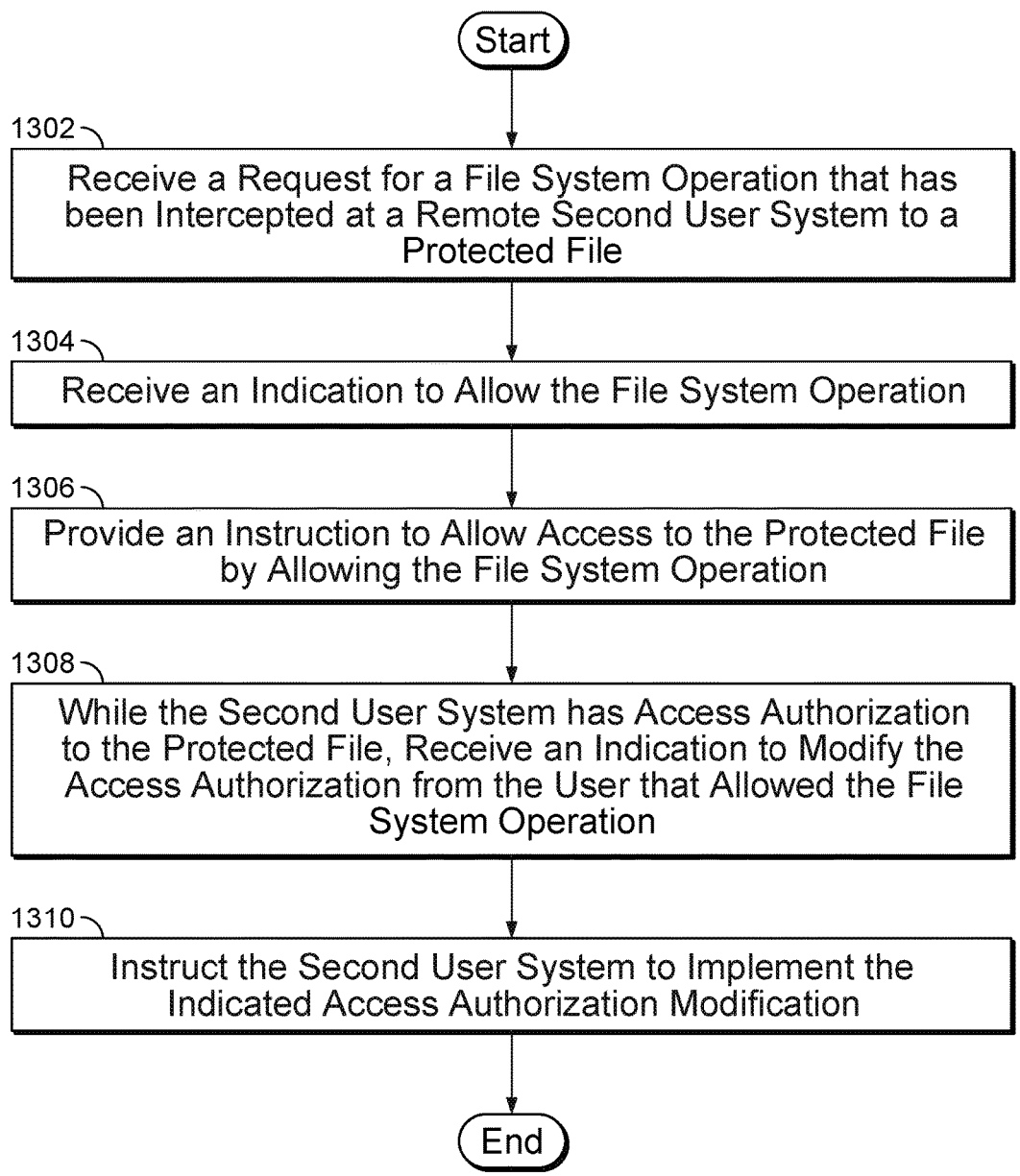
FIG. 13 is a flow chart illustrating an embodiment of a process for modifying access that has been granted.

FIG. 13 is a flow chart illustrating an embodiment of a process for modifying access that has been granted. The process of FIG. 13 may be implemented using one or more components of admin server 112 and/or access server 110 of FIG. 1. For example, a virtual file system, an installed encryption management application, and/or one or more callback modules installed on user system 102 or an encryption management application installed on mobile device 118 performs at least a portion of the process of FIG. 13.

At 1302, a request for a file system operation that has been intercepted at a remote second user system to a protected file is received. In some embodiments, the protected file is the file sent from an originator to a recipient second user using at least a portion of the process of FIG. 11 and the originator has retained control over the access to the protected file. In some embodiments, on the system of the remote second user system, an installed virtual file system and/or application managing security of the protected file intercepts access to the protected file using at least a portion of the process of FIG. 3. In some embodiments, the request is associated with the request to obtain an access key at 508 of FIG. 5. In some embodiments, the request includes the request to access the protected file at 602 of FIG. 6. In some embodiments, the request includes the request in 802 of FIG. 8. The request may be received on a remote server that coordinates access to the protected file. In some embodiments, the file system operation has been intercepted by a virtual file system that encapsulates operation of one or more underlying file system operations (e.g., intercepted by file system 106 of FIG. 1).

At 1304, an indication to allow the file system operation is received. The indication may be received from a user system and/or a mobile device of the originator that is able to remotely control access to the protected content in response to a request to allow or deny the received request. For example, a user system and/or a mobile device that corresponds to a user that controls access to the protected file is, identified and an access request is sent to the identified system/device and the user provides the indication to allow the file system operation. In some embodiments, the indication is a received access authorization in 610 of FIG. 6. In some embodiments, the indication is provided by a mobile device that authenticated with the user system of the originator using at least a portion of the process of FIG. 7.

At 1306, an instruction to allow access to the protected file by allowing the file system operation is provided. For example, an instruction is sent to the remote second user system that the file system operation is allowed. In some embodiments, providing the instruction includes providing an access key from an access server (e.g., server 110 of FIG. 1).

At 1308, while the second user system has access authorization to the protected file, an indication to modify the access authorization is received from the user that allowed the file system operation. For example, using an interactive list of previous accesses to the protected file provided using the process of FIG. 12, the user that allowed the file system operation modifies the access granted in 1304 while a second user is still accessing the protected file. The modified access authorization indication may indicate revoking the access, modifying an amount of content able to be accessed (e.g., modify amount of redacted content), granting a greater access, deleting the file from the second user system, etc.

At 1310, the second user system is instructed to implement the indicated access authorization modification. For example, a virtual file system and/or an application of the second user system managing access authorization to the protected file receives the modification provided via a network and implements the modification. In some embodiments, the virtual file system and/or an application of the second user system may terminate a user application and/or a file system operation utilizing the protected file to implement the authorization modification. In some embodiments, the protected file is deleted to implement the access authorization modification. In some embodiments, a new version of the protected file protected by the new modified access authorization is stored to implement the access authorization modification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic encryption key selection, comprising:

a processor configured to:

receive a request to store a file to be protected;

detect whether the file to be protected is to be synchronized;
and
encrypt the file to be protected using a selected encryption key;
wherein:
when it is detected that the file to be protected is to be synchronized, the selected encryption key is a same encryption key that is to be utilized to encrypt across any other instances the file to be synchronized and protected, wherein the same encryption key was selected among a plurality of encryption key options;
when the request indicates the file to be protected is to be synchronized with another instance of the file, the selected encryption key to encrypt the file to be protected is an encryption key that was utilized to encrypt the another instance of the file; and
when it is detected that the file to be protected is not to be synchronized, the selected encryption key is a unique encryption key, wherein each encryption key to be utilized to encrypt each of any different instances of the file to be protected but not synchronized is unique for each of the any different instances and selecting the unique encryption key includes generating a new encryption key; and
a memory coupled to the processor and configured to provide the processor with instructions.

2. The system of claim 1, wherein the request is a file system operation.

3. The system of claim 1, wherein the request to store the file to be protected has been intercepted by a virtual file system.

4. The system of claim 1, wherein a user-defined callback detects whether the file to be protected is a file to be synchronized.

5. The system of claim 1, wherein the request indicates a user indication that the file is to be protected.

6. The system of claim 1, wherein the system includes a storage storing the encrypted file to be protected.

7. The system of claim 1, wherein the request indicates a level of protection to be applied to the file.

8. The system of claim 1, wherein the request indicates whether the file is a file to be synchronized.

9. The system of claim 1, wherein detecting whether the file to be protected is to be synchronized includes automatically determining whether the file to be protected is a file to be synchronized based at least in part on detected information about the file or the request.

10. The system of claim 9, wherein the detected information about the file or the request includes detecting a user application that requested the request.

11. The system of claim 9, wherein the detected information about the file or the request includes detecting a context of use of the file.

12. The system of claim 1, wherein it is detected that the file to be protected is to be synchronized in the event it is determined that the request is associated with a user application known to perform file synchronization.

13. The system of claim 1, wherein detecting whether the file to be protected is to be synchronized includes determining whether the file is to be synchronized with one or more other copies of the file.

14. The system of claim 1, wherein encrypting the file to be protected using the selected encryption key includes storing an access key corresponding to the selected encryption key at a remote key server.

15. The system of claim 1, wherein encrypting the file to be protected using the selected encryption key includes requesting the selected encryption key from a key server using an identifier of the file to be protected.

16. The system of claim 1, wherein encrypting the file to be protected using the selected encryption key includes selecting a plurality of encryption keys for the file to be protected and each different encryption key of the plurality of encryption keys corresponds to a different level of access to the file to be protected.

17. A method for dynamic encryption key selection, comprising:
receiving a request to store a file to be protected;
using a processor to detect whether the file to be protected is a file to be synchronized;
and
encrypting the file to be protected using a selected encryption key;
wherein:
when it is detected that the file to be protected is to be synchronized, the selected encryption key is a same encryption key that is to be utilized to encrypt across any other instances the file to be synchronized and protected, wherein the same encryption key was selected among a plurality of encryption key options;
when the request indicates the file to be protected is to be synchronized with another instance of the file, the selected encryption key to encrypt the file to be protected is an encryption key that was utilized to encrypt the another instance of the file; and
when it is detected that the file to be protected is not to be synchronized, the selected encryption key is a unique encryption key, wherein each encryption key to be utilized to encrypt each of any different instances of the file to be protected but not synchronized is unique for each of the any different instances and selecting the unique encryption key includes generating a new encryption key.

18. A computer program product for dynamic encryption key selection, the computer program product being embodied in a non-transitory computer readable storage medium and comprising computer instructions for:
receiving a request to store a file to be protected;
detecting whether the file to be protected is a file to be synchronized;
and
encrypting the file to be protected using a selected encryption key;
wherein:
when it is detected that the file to be protected is to be synchronized, the selected encryption key is a same encryption key that is to be utilized to encrypt across any other instances the file to be synchronized and protected, wherein the same encryption key was selected among a plurality of encryption key options;
when the request indicates the file to be protected is to be synchronized with another instance of the file, the selected encryption key to encrypt the file to be protected is an encryption key that was utilized to encrypt the another instance of the file; and
when it is detected that the file to be protected is not to be synchronized, the selected encryption key is a unique encryption key, wherein each encryption key to be utilized to encrypt each of any different instances of the file to be protected but not synchronized is unique for each of the any different instances and selecting the unique encryption key includes generating a new encryption key.

19. The method of claim 17, wherein detecting whether the file to be protected is to be synchronized includes automatically determining whether the file to be protected is to be synchronized based at least in part on detected information about the file or the request and the detected information about the file or the request includes detecting a context of use of the file.

20. The method of claim 17, wherein encrypting the file to be protected using the selected encryption key includes selecting a plurality of encryption keys for the file to be protected and each different encryption key of the plurality of encryption keys corresponds to a different level of access to the file to be protected.

* * * * *